(12) United States Patent
Luo

(10) Patent No.: US 12,052,655 B2
(45) Date of Patent: Jul. 30, 2024

(54) INTERNET OF THINGS NETWORK MANAGEMENT METHOD

(71) Applicant: Shenzhen Chenbei Technology Co., Ltd., Shenzhen (CN)

(72) Inventor: Lei Luo, Shenzhen (CN)

(*) Notice: Subject to any disclaimer, the term of this patent is extended or adjusted under 35 U.S.C. 154(b) by 329 days.

(21) Appl. No.: 17/530,415

(22) Filed: Nov. 18, 2021

(65) Prior Publication Data

US 2022/0159559 A1 May 19, 2022

(30) Foreign Application Priority Data

Nov. 19, 2020 (CN) .......................... 202011305617.6

(51) Int. Cl.
| | |
|---|---|
| *H04W 48/16* | (2009.01) |
| *G16Y 30/10* | (2020.01) |
| *G16Y 40/30* | (2020.01) |
| *H04L 41/08* | (2022.01) |
| *H04L 41/084* | (2022.01) |
| *H04L 41/0893* | (2022.01) |
| *H04W 4/80* | (2018.01) |
| *H04W 48/08* | (2009.01) |
| *H04W 48/10* | (2009.01) |
| *H04W 76/10* | (2018.01) |
| *H04W 76/14* | (2018.01) |
| *H04W 84/12* | (2009.01) |

(52) U.S. Cl.
CPC ............ *H04W 48/16* (2013.01); *G16Y 40/30* (2020.01); *H04L 41/0846* (2013.01); *H04L 41/0886* (2013.01); *H04L 41/0889* (2013.01); *H04L 41/0893* (2013.01); *H04W 4/80* (2018.02); *H04W 48/08* (2013.01); *H04W 48/10* (2013.01); *H04W 76/10* (2018.02); *H04W 76/14* (2018.02); *G16Y 30/10* (2020.01); *H04W 84/12* (2013.01)

(58) Field of Classification Search
CPC ..... H04W 48/00; H04W 48/10; H04W 48/16; H04W 76/10; H04W 84/12; H04W 4/80; H04W 48/08; H04W 76/14; G16Y 30/10; G16Y 40/30; H04L 41/0889; H04L 41/0846; H04L 41/0886; H04L 41/0893
See application file for complete search history.

(56) References Cited

U.S. PATENT DOCUMENTS

| | | | |
|---|---|---|---|
| 10,873,983 B1 * | 12/2020 | Patel | ................. H04W 52/0241 |
| 11,606,690 B1 * | 3/2023 | Robinson | ............. H04B 17/318 |
| 2003/0064718 A1 * | 4/2003 | Haines | ................. H04W 48/16 |
| | | | 455/67.11 |

(Continued)

*Primary Examiner* — Omar J Ghowrwal
*Assistant Examiner* — Adam Joel Cerlanek
(74) *Attorney, Agent, or Firm* — Tsz Lung Yeung

(57) ABSTRACT

A method of managing network connection for an IOT network comprising the steps of: (101) acquiring a SSID list for an unconnected IOT participating device, and retrieving a SSID data set, the SSID data set; (102) obtaining a SSID target set; (103) when the SSID target set contains at least two SSID candidates, ascertaining a target SSID from the SSID candidate according to a performance parameter of each of the SSID candidates; and (104) connecting the unconnected IOT participating device to a predetermined IOT network which corresponds to the target SSID by using a corresponding SSID password thereof to become a newly connected IOT participating device.

2 Claims, 10 Drawing Sheets

(56) References Cited

U.S. PATENT DOCUMENTS

| 2016/0021610 | A1* | 1/2016 | Wan | H04L 63/0876 |
| | | | | 370/329 |
| 2018/0220472 | A1* | 8/2018 | Schopp | H04L 63/0428 |
| 2020/0344593 | A1* | 10/2020 | Hsu | H04W 76/14 |
| 2021/0399943 | A1* | 12/2021 | Luo | H04L 12/2807 |

* cited by examiner

INTERNET OF THINGS NETWORK MANAGEMENT METHOD

CROSS REFERENCE TO RELATED APPLICATION

This is a non-provisional application which claims priority to a Chinese patent application having an application number of 202011305617.6, and a filing date of Nov. 19, 2020, the entire contents of which is hereby incorporated by reference.

BACKGROUND OF THE PRESENT INVENTION

Field of Invention

The present invention relates to Internet of Things (hereinafter referred to "IOT"), and more particularly to an IOT management and control system, and its method thereof, which are capable of enhancing users experience in connecting an IOT participating device to an IOT network.

Description of Related Arts

With the rapid development of Internet of Things (hereinafter referred as "IOT") technology, the variety of IOT devices is also increasing, hence the difficulty of managing different IOT devices. Conventionally, users have to manually connect or set up an IOT device to an IOT network, but these set up procedures require cumbersome operations, poor users experience and may cause other technical issues.

As a result, there is a need to develop a distribution control method, system, devices and storage medium for IOT networks which may resolve the above-mentioned problems.

SUMMARY OF THE PRESENT INVENTION

Certain variations of the present invention provide an IOT management and control system, and its method thereof, which are capable of enhancing users' experience in connecting an IOT participating device to an IOT network.

In one aspect of the present invention, it provides a method of managing network connection for an IOT network, comprising the steps of:

(101) acquiring a SSID ("Service Set Identifier") list for a network connection of an unconnected IOT participating device from the unconnected IOT participating device, and retrieving a SSID data set from a server, the SSID data set including information relating to at least one SSID having past successful connections and corresponding SSID passwords for a predetermined past period of time, wherein the SSID list is detected by the unconnected IOT participating device;

(102) according to the SSID list and SSID data set, obtaining a SSID target set, the SSID target set including information relating to SSID candidate which is to be used for the network connection of the unconnected IOT participating device, and corresponding SSID password for the SSID candidate;

(103) when the SSID target set contains at least two SSID candidates, ascertaining a target SSID from the SSID candidates according to a performance parameter of each of the SSID candidates; and (104) connecting the unconnected IOT participating device to a target network which corresponds to the target SSID by using a corresponding SSID password thereof to become a connected IOT participating device.

In another aspect of the present invention, it provides an IOT network management system, comprising:

an unconnected IOT participating device configured to deliver broadcast signals, the broadcast signals including at least one of an identification information, a SSID list, and an authentication parameter;

a server connected to a client terminal and configured to store a SSID data set, the SSID data set including information relating to at least one SSID having past successful connections and corresponding SSID passwords for a predetermined past period of time; and a client terminal connected to the server and the unconnected IOT participating device, the client terminal configured to obtain a SSID target set by reference to the SSID list and SSID data set, the SSID target set including information relating to a SSID candidate which is to be used for network connection of the unconnected IOT participating device, and corresponding SSID password for the SSID candidate, wherein when the SSID target set contains at least two SSID candidates, the client terminal being configured to connect the unconnected IOT participating device to a target network which corresponds to the target SSID by using a corresponding SSID password.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Therefore, the above terms should not be an actual connection limitation of the elements of the present invention.

Figure 1:
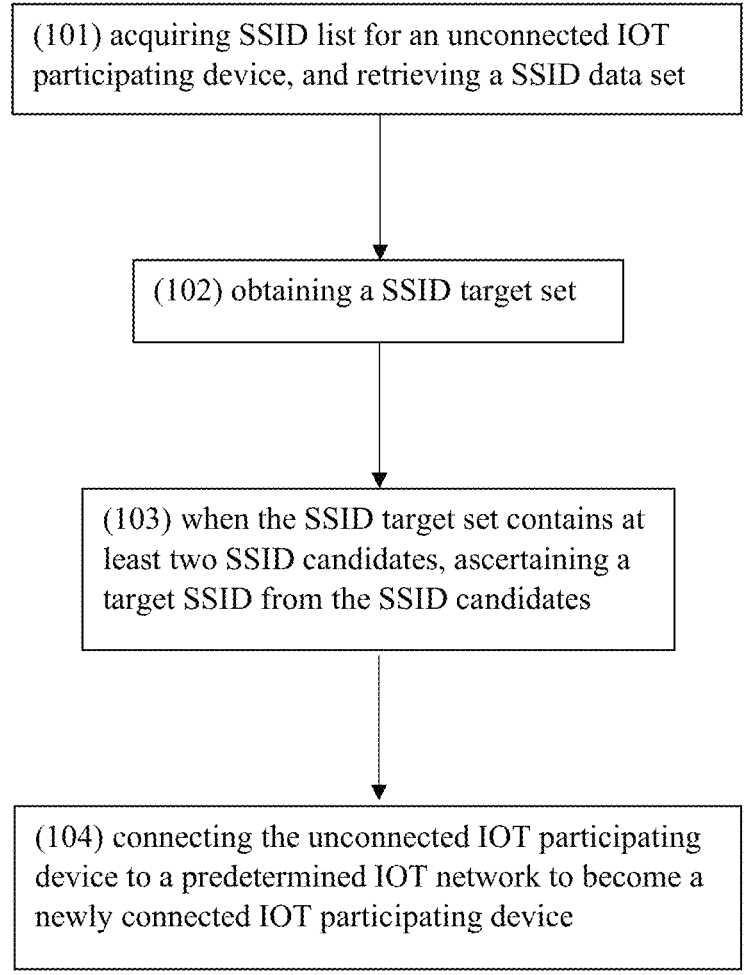
FIG. 1 is block diagram illustrating a method of managing network connection for an IOT network according to a preferred embodiment of the present invention.

Referring to FIG. 1 of the drawings, a method of managing network connection for an Internet of Things (hereinafter referred to "IOT") network according to a preferred embodiment of the present invention is illustrated. The method may comprise the steps of:

(101) acquiring a SSID ("Service Set Identifier") list for a network connection of an unconnected IOT participating device from the unconnected IOT participating device, and retrieving a SSID data set from a server, the SSID data set including information relating to at least one SSID having past successful connections and corresponding SSID passwords for a predetermined past period of time, wherein the SSID list is detected by the unconnected IOT participating device;

(102) according to the SSID list and SSID data set, obtaining a SSID target set, the SSID target set including information relating to SSID candidate which is to be used for the network connection of the unconnected IOT participating device, and corresponding SSID password for the SSID candidate;

(103) when the SSID target set contains at least two SSID candidates, ascertaining a target SSID from the SSID candidates according to a performance parameter of each of the SSID candidates; and (104) connecting the unconnected IOT participating device to a target network which corresponds to the target SSID by using a corresponding SSID password thereof to become a connected IOT participating device.

It is worth mentioning that the above-mentioned steps may be accomplished by corresponding IOT control devices, such as computers having different modules, processors, and memory devices. Such hardware will be described below. Moreover, the IOT control devices may be connected and configured as client terminals, servers, or even incorporated in one of the connected IOT participating devices. The connected IOT participating devices and the IOT control devices may form an IOT network.

According to the preferred embodiment of the present invention, each of the client terminal and the server may be connected to local area network. Along with all connected IOT participating devices, they form a IOT network. The client terminal may be configured as hardware which allows a user to control and manage the progress of IOT connection, and to observe the status of the entire IOT network. An example of a client terminal may be a smartphone having a display and a speaker. The client terminal may also be configured as a computer having a display and a speaker. The server may also be configured as a computer. The client terminal may be connected to the server through a predetermined network, such as Internet.

As exemplary configurations, the IOT participating device may be embodied as smart electrical appliances, such as a smart socket, a smart air fryer, a smart humidifier, a smart air purifier, a smart water heater, a smart refrigerator, a smart air conditioning system, or a smart curtain etc. In step (101), the SSID list is formed by series of detected SSIDs around the unconnected IOT participating device. When a new unconnected IOT participating device searches for a IOT network to join in, it can detect the SSIDs represent different available IOT networks around it. And the SSID list is formed by those detected SSIDs.

The server may be configured and programmed to store data about successfully connected SSID and the corresponding password. As a result, when a client terminal has successfully established a connection for a particular connected IOT participating device, the corresponding information about this successful connection, such as the connected SSID, the relevant password, the connection time etc. may be sent to the server for storing as successful connection history. This successful connection history may be used by the IOT participating device in the future. Therefore, a user of one or more IOT participating devices does not need to re-connect to the IOT network every time a user would like to connect the IOT participating devices back to the IOT network by choosing the relevant SSID and entering the corresponding passwords.

Moreover, the client terminal may acquire information about the SSID list, and the SSID data set from the server. In order to avoid too much data received by the IOT participating devices, the SSID data set may be limited or restricted by the information contained in a predetermined past period of time. In other words, the client terminal may acquire information about the SSID list, and the SSID data set from the server, and the information acquired may belong to the past predetermined period of time. Thus, the information may relate to the connected SSID(s) and the corresponding password(s) that fall within a predetermined period of time. The predetermined period of time may be three months, six months, one year, or other past periods of time.

The method may obtain the SSID target set and the corresponding passwords for each target SSID from the SSID list and the SSID data set mentioned above. Specifically, each of the SSIDs in the SSID list is to be matched with each SSID in the SSID data set. When a SSID in the SSID list matches with the SSID in the SSID data set, that particular SSID and the corresponding password may be assigned as a SSID candidate and store in the SSID target set. As such, the SSID target set for the corresponding IOT participating device may be rapidly retrieved. The corresponding IOT participating device may then be rapidly and automatically connected to the corresponding SSID in the SSID target set. A user that corresponding IOT participating device does not need to manually connect the IOT participating device to a desirable SSID through manually re-choosing the SSID and re-typing the corresponding password.

When the SSID data set includes only a single SSID candidate, the SSID candidate may be assigned as target SSID, wherein the corresponding IOT participating device may be connected to this target SSID through the corresponding password. When the SSID date set includes at least two SSID candidates, the performance parameter of each of the SSID candidates may be obtained. The target SSID may be ascertained or chosen according to the performance parameters of the SSID candidates.

The present invention provides a method of controlling network distribution for an Internet of Things (hereinafter referred to "IOT") network by referencing information about connected SSIDs and the corresponding passwords in a predetermined period of time stored in a server. The method allows ascertaining and assigning certain SSID as target SSID and automatically connects the IOT participating device to the target SSID by using a relevant pre-stored password. Thus, a user of one or more IOT participating devices does not need to re-connect to the IOT network every time a user would like to connect the IOT participating devices to the IOT network by manually re-choosing the relevant SSID and re-entering the corresponding passwords. Moreover, when more than one SSID is in the SSID target set, the best SSID will be automatically chosen according to predetermined performance parameters of the corresponding SSIDs. These steps substantially enhance the effectiveness and efficiency in forming IOT network and enhancing users' experience.

In this preferred embodiment, the performance parameters of a particular SSID may include a first performance parameter which characterizes that corresponding SSID in the IOT network environment, such as the most recent successful connection time, signal strength, the number of previous successful connections in the predetermined period of time, etc. In this regard, the first performance parameter may be set as a criterion for selecting which SSID candidate.

It is worth mentioning that when the first performance parameter differs, the criterion may also differ accordingly. For example, when the first performance parameter is set as the most recent successful connection time, the criterion may be set as the SSID having the most recent successful connection. For example, one SSID candidate may have the most recent successful connection time as 2 hours (from now), while another SSID candidate may have the most recent successful connection time as 1 hour (from now), the latter SSID candidate may fulfil the criterion. As another example, when the first performance parameter is set as signal strength, the criterion may be set as the SSID having the strongest signal strength among SSID candidates. As another example, when the first performance parameter is set as number of previous successful connections in a predetermined period of time, the criterion may be set as greatest number of previous successful connections among SSID candidates.

As an alternative, the selection of the SSID candidate may depend on more than one performance parameters. For example, two performance parameters may be used to select the best SSID from all SSID candidates. Thus, in a similar fashion, the performance parameters of a particular SSID may include a second performance parameter which characterizes that corresponding SSID in the IOT network environment, such as the most recent successful connection time, signal strength, the number of previous successful connections in the predetermined period of time, etc. The criterion for choosing a particular SSID may be modified and the first performance parameter and the second performance parameter may be combined to determine whether or not a SSID candidate fulfills the newly modified criterion.

For example, when the first parameter is set as the most recent successful connection time for a predetermined period of time, and the second performance parameter is set as signal strength, the criterion may be set as the SSID having the most recent successful connection and having the strongest signal strength. As another example, when the first performance parameter is set as the most recent successful connection time for a predetermined period of time, and the second performance parameter is set as the number of previous successful connections in the same predetermined period of time, the criterion may be set as the SSID having the most recent successful connection time and the greatest number of previous successful connection among the SSID candidates.

In another variation of the present invention, the performance parameters of a particular SSID may include a third performance parameter which includes the number of connected IOT participating devices. The number of connected IOT participating devices as the third performance parameter may be sent to the server. When an unconnected IOT device discovers available SSIDs, the number of connected IOT participating devices for each SSID candidate may be obtained by the client terminal. This information may also be visually indicated or audially broadcasted in the client terminal.

In this variation of the present invention, more than one criterion may be sequentially applied to the SSID candidates in the SSID target set so as to choose the best available SSID for connecting to the IOT participating device. For example, when the first performance parameter is set as signal strength and the second performance parameter is set as the number of connected IOT participating devices, the first criterion may be set as the SSID having a threshold signal strength, while the second criterion may be set as the SSID having the smallest number of connected IOT participating devices. In this scenario, the first criterion and the second criterion may be sequentially applied to the SSID candidates so that the first criterion selects those SSID candidates reaching the threshold signal strength, while the second criterion selects those SSID which has fulfilled the first criterion, and which connect to the smallest number of IOT participating devices. These selection procedures ensure that the IOT participating device will be connected to a SSID which has acceptable signal strength and which has connected to the smallest number of other IOT participating device.

From the forgoing descriptions, it can be appreciated that the number and characteristics of performance parameters may be varied according to different circumstances of the IOT network. Moreover, the number and the sequence of criterion mentioned above in selecting the most desirable SSID can also be altered to fit different applications circumstances of the present invention.

Before the client terminal can establish successful connection with the IOT participating device for obtaining the corresponding SSID set, the client terminal may connect to or communicate with the IOT participating device through Access Point ("AP"). In this case, the IOT participating device may be switched to AP mode in order to communicate with the client terminal through AP.

Figure 2:
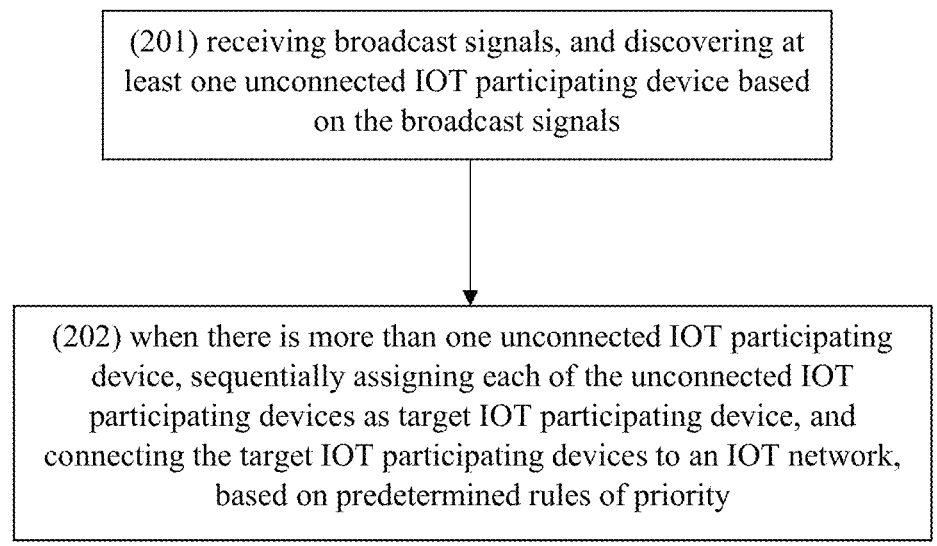
FIG. 2 is another block diagram illustrating additional steps for the method of managing network connection for an IOT network according to the preferred embodiment of the present invention.

Referring to FIG. 2 of the drawings, the method of managing network connection for IOT network further comprising the steps, before step (101), of:

(201) receiving broadcast signals, and discovering at least one unconnected IOT participating device based on the broadcast signals; and (202) when there is more than one unconnected IOT participating device, sequentially assigning each of the unconnected IOT participating devices as target IOT participating device, and connecting the target IOT participating devices to an IOT network, wherein the sequence of connecting the unconnected IOT participating devices is determined by a set of predetermined rules of priority.

According to the preferred embodiment of the present invention, a given unconnected IOT participating device may enter a connection mode when it is powered on for being connected to an IOT. The unconnected IOT participating device may be arranged to deliver broadcast signals which may include device identification information of that particular unconnected IOT participating device, and other information relating to the detected SSIDs. For example, the unconnected IOT participating device may be arranged to search for available SSIDs in surrounding area and the broadcast signals may also include a SSID list. For each of the SSIDs contained in this SSID list, the broadcast signals may also include the number of connected IOT participating devices.

The client terminal may be arranged to receive the broadcast signals, and may determine the number of unconnected IOT participating device(s) based on the information in the broadcast signals.

According to the preferred embodiment of the present invention, the broadcast signals may further include a plurality of authentication parameters, wherein the authentication parameters may include information relating to a model number and location of the unconnected IOT participating device. The client terminal may be arranged to send the authentication parameters to the server as an authentication request. The server may then verify that the information contained in the authentication parameters match the corresponding information stored in the server. For example, the authentication parameters may include information relating to a model number and location of the unconnected IOT participating device. The server may then verify that this model number and location of the unconnected IOT participating device is on a pre-stored list for allowing the unconnected IOT participating device to join the IOT network. If the model number and the location match with the record stored in the server, the authentication request will pass. If the model number and the location do not match with the record stored in the server, the authentication request will fail.

It is worth mentioning that the unconnected IOT participating devices which are to be assigned to the IOT network by the steps and procedures mentioned above are those unconnected IOT participating devices which pass the authentication request based on the broadcast signals. The number of unconnected IOT participating devices may be anywhere from 0, 1 or 2 or more. 0 means there is no unconnected IOT participating device which needs to be connected to IOT network. When there is only one unconnected IOT participating device which needs to be connected to the IOT network, that unconnected IOT participating device may be arranged to be connected to the IOT network through steps (101) through (104). When there are two unconnected IOT participating devices which need to be connected to the unconnected IOT network, the sequence of connecting the unconnected IOT participating devices must be determined by a predetermined set of rules of priority. For example, the unconnected IOT participating device having the highest priority may be given the first priority to get connected to the IOT network. Similarly, the unconnected IOT participating device having the second highest priority may be given the second priority to get connected to the IOT network, so on and so forth.

Furthermore, when there is more than one unconnected IOT participating device which needs to be connected to the IOT network, information relating to the unconnected IOT participating device may be displayed on a display medium of the client terminal. For example, the information relating to the unconnected IOT participating device may be the generic name, model, brand, or other descriptions of that particular unconnected IOT participating device. A user may monitor or control the IOT participating devices over the IOT network through operation on the client terminal, such as confirming that a certain IOT participating device is to be connected to or disconnected from a IOT network. The client terminal may be configured to generate visual, audible or vibrational alerts to the user. The IOT participating device may be illustrated in the form of icons shown on a display medium of the client terminal. When the icon is clicked, the corresponding unconnected IOT participating device may be connected to the IOT network according to the steps described above to become a connected IOT participating device. The unconnected IOT participating device which is to be connected to the IOT network may be explicitly chosen by a user of the present invention, or the IOT participating device may be determined by the procedures described above.

The information for each successful connection by one unconnected IOT participating device to the IOT network may be transmitted from the client terminal to the server. The information may then be stored in the server. The information may include connection time, the corresponding SSID, and the corresponding password etc. This information may be utilized to facilitate connection of the next target IOT participating device.

Furthermore, the server may be arranged to generate a verification code for each of the unconnected IOT participating device which has passed the authentication request. Such verification code may be utilized to allow the corresponding unconnected IOT participating device to connect to the server when it has been connected to the local area network.

Specifically, the client terminal may send a corresponding verification code, a target SSID and the corresponding password to a relevant IOT participating device. The unconnected IOT participating device may utilize the verification code and the password to connect to the target SSID and the corresponding local area network. The unconnected IOT participating device may then send a request to the server. The server may then verify the verification code sent by the unconnected IOT participating device. If the verification code sent by the unconnected IOT participating device matches with the verification code stored in the server, the server is configured to allow the unconnected IOT participating device to fully connect to the IOT network.

According to the preferred embodiment of the present invention, the priority of connecting to IOT network by at least two unconnected IOT participating devices may be determined by the steps of:

(a) obtaining a strength of the broadcast signals of an unconnected IOT participating device, a total number of unconnected IOT participating devices in an IOT network, and the time at which the broadcast signals is received; and (b) ascertaining the priority of connecting to IOT network by at least two unconnected IOT participating devices based on the strength of the broadcast signals of the IOT participating device, a total number of connected IOT participating devices, and the time at which the broadcast signals is received.

It is worth mentioning that the strength of the broadcast signals of the unconnected IOT participating device, a total number of unconnected IOT participating devices, and the time at which the broadcast signals is received may be obtained by the client terminal. For example, the strength of the broadcast signals and the time of receiving them may be determined by the client terminal when the broadcast signal is received by the client terminal. The total number of unconnected IOT participating devices may be determined through many references. For example, the total number of unconnected IOT participating devices may be determined by reference to the total number of IOT participating devices which have passed the authentication requests.

Step (b) may comprise the steps of:
when the total number of unconnected IOT participating devices is no greater than a predetermined threshold, assigning the priority of connections of the IOT participating devices based on the time at which the broadcast signals is received, wherein the IOT participating device having the earliest broadcast signal time is accorded the first priority to be connected to the IOT network; and when the total number of unconnected IOT participating devices is greater than the predetermined threshold, assigning the priority of connections of the IOT participating devices based on the strength of the received broadcast signals, wherein the IOT participating device having the strongest broadcast signal strength is accorded the first priority to be connected to the IOT network.

It is worth mentioning that other rules for determining priority may also be adopted depending on the actual circumstances in which the present invention is implemented.

The IOT participating devices may send broadcast signals to the client terminals so as to let users of the present invention know that the IOT participating devices are ready for connecting to the IOT network. The client terminal may then share the broadcast signals with the server. The IOT participating devices may then be connected to the IOT network according to the methods and procedures described above.

Figure 3:
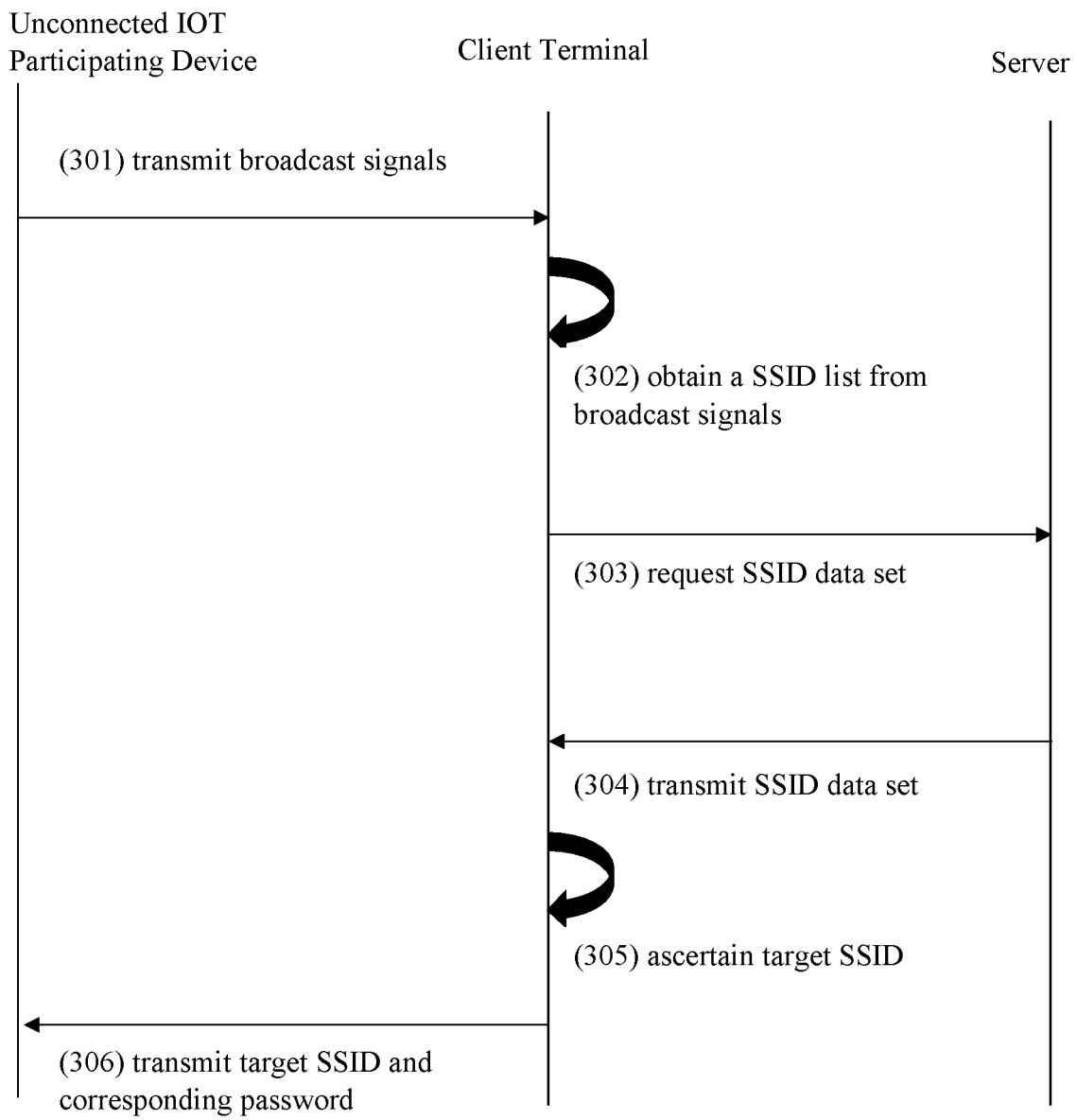
FIG. 3 is a schematic diagram illustrating interaction between IOT participating devices and IOT control devices according to the preferred embodiment of the present invention.

Referring to FIG. 3 of the drawings, the target SSID may be determined by the client terminal. Specifically, step (101) may comprise the steps of:

(301) transmitting broadcast signals by an unconnected IOT participating device;

(302) obtaining a SSID list from the broadcast signals by the client terminal;

(303) requesting SSID data set from the server by the client terminal; and (304) transmitting SSID data set by the server to the client terminal.

Moreover, step (102) may comprise the step (305) of ascertaining a target SSID by the client terminal by reference to the SSID list and SSID data set.

Step (104) may comprise the step (306) of transmitting target SSID and the corresponding password from the client terminal to the unconnected IOT participating device, so as to allow the unconnected IOT participating device to connect to the IOT network through the target SSID and the corresponding password to become a newly connected IOT participating device.

It is worth mentioning that the above steps refer to a specific example of how an unconnected IOT participating device may be connected to an IOT network through interaction between the client terminal and the server to become a connected IOT participating device.

Accordingly, when a given IOT participating device has powered on and entered the connection mode, that given IOT participating device may search for available SSID and generate a SSID list. The SSID list may then be delivered as broadcast signals which may include an identification information of that particular IOT participating device, and other information relating to the detected SSIDs. The client terminal may then receive the broadcast signals which include the SSID list. The server may then send a SSID data set to the client terminal. The client terminal may then ascertain a target SSID by reference to the SSID list and SSID data set. The client terminal may then send the information relating to the target SSID and the corresponding password to the IOT participating device, so as to allow the IOT participating device to connect to the IOT network through connecting to the local area network of the target SSID by using the corresponding password.

Furthermore, when an IOT participating device has not been connected to the IOT network, the IOT participating device and the client terminal may be communicated through Access Point ("AP"). Moreover, the client terminal and the server may also be communicated through a designated account and password created in the server.

Figure 4:
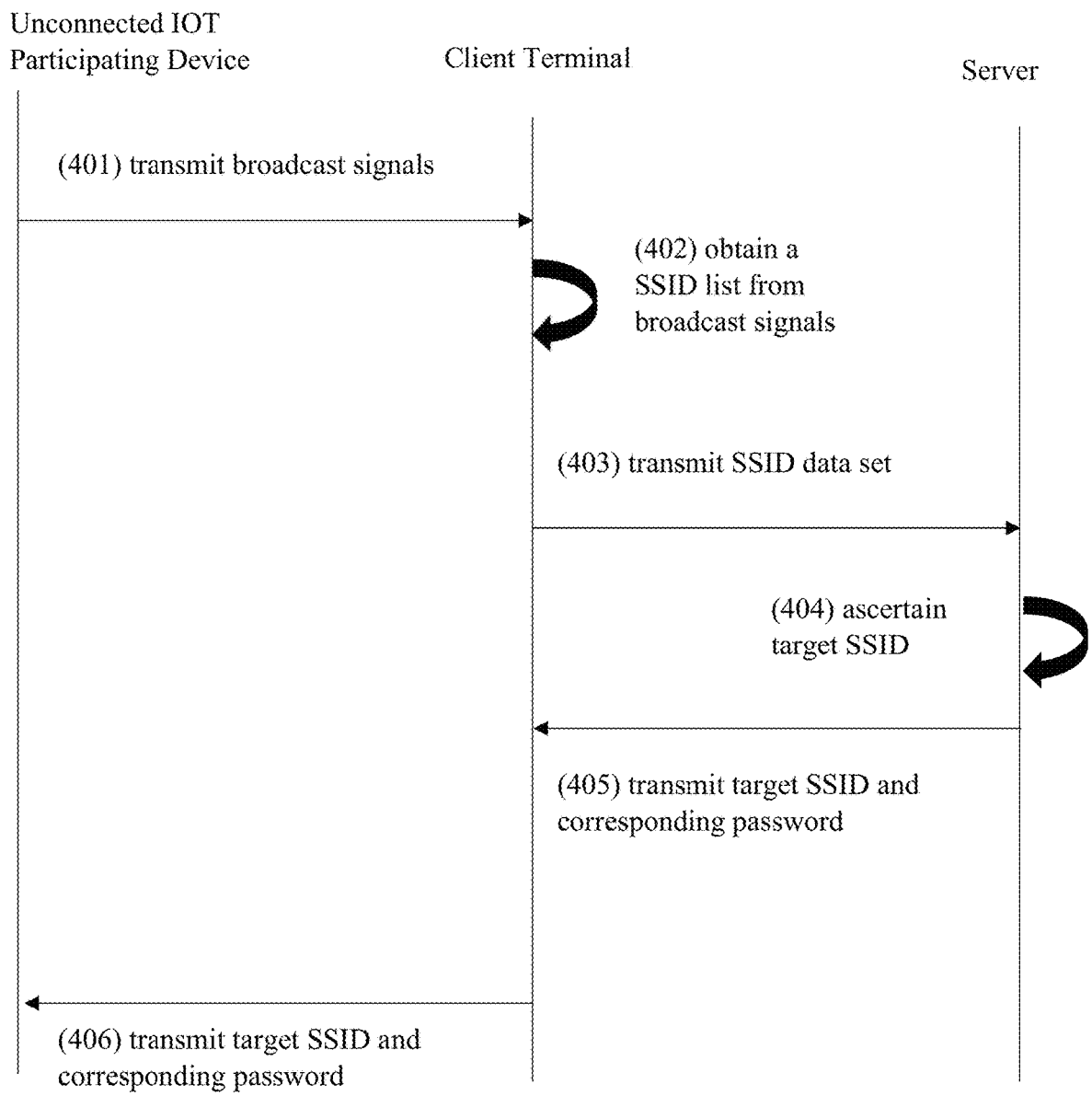
FIG. 4 is a schematic diagram illustrating interaction between IOT participating devices and IOT control devices according to the first alternative mode of the preferred embodiment of the present invention.

Referring to FIG. 4 of the drawings, as a first alternative of the preferred embodiment of the present invention, the target SSID may also be determined by the server, instead of the client terminal.

Thus, step (101) may comprise the steps of:

(401) transmitting broadcast signals by an unconnected IOT participating device;

(402) obtaining a SSID list from the broadcast signals by the client terminal; and (403) transmitting SSID list from the client terminal to the server.

Moreover, step (103) may comprise the step (404) of ascertaining a target SSID by the server by reference to the SSID list and SSID data set.

Step (104) may comprise the steps of:

(405) transmitting the target SSID and the corresponding password from the server to the client terminal; and (406) transmitting the target SSID and the corresponding password from the client terminal to the unconnected IOT participating device, so as to allow the unconnected IOT participating device to connect to the IOT network through the target SSID and the corresponding password to become a newly connected IOT participating device.

Accordingly, when a given IOT participating device has powered on and entered the connection mode, that given IOT participating device may search for available SSID and generate a SSID list. The SSID list may then be delivered as broadcast signals which may include an identification information of that particular IOT participating device, and other information relating to the detected SSIDs. The client terminal may then receive the broadcast signals which include the SSID list. The client terminal may then transmit the SSID list to the server, which also stores the SSID data set. The server may then ascertain a target SSID by reference to the SSID list and SSID data set. The server may then transmit the information relating to the target SSID and the corresponding password to the client terminal, which in turns transmit the target SSID and the corresponding password to the IOT participating device, so as to allow the IOT participating device to connect to the IOT network through connecting to the local area network of the target SSID by using the corresponding password.

Furthermore, when an IOT participating device has not been connected to the IOT network, the IOT participating device and the client terminal may be communicated through Access Point ("AP"). Moreover, the client terminal and the server may also be communicated through a designated account and password created in the server.

Figure 5:
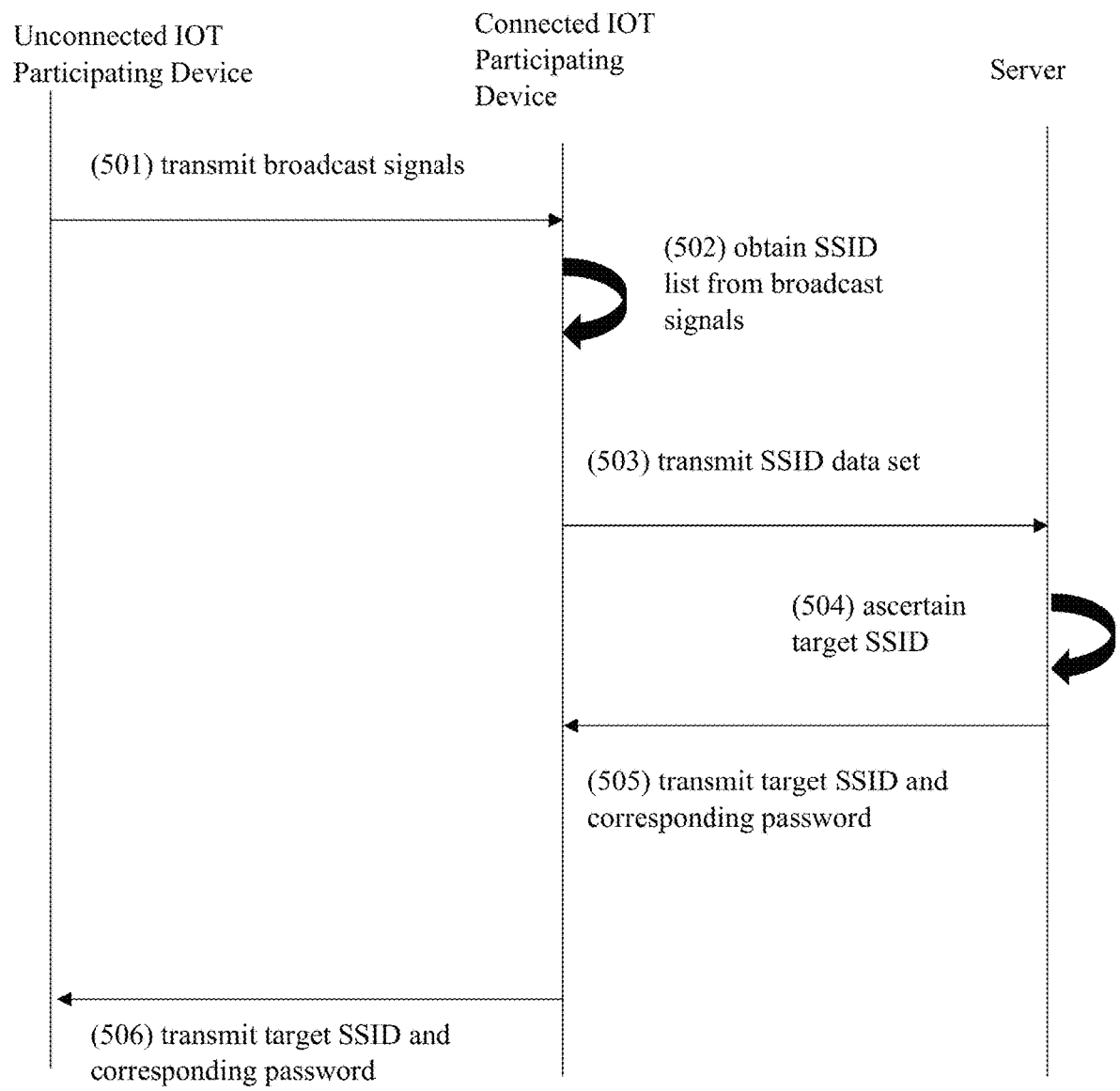
FIG. 5 is a schematic diagram illustrating interaction between IOT participating devices and IOT control devices according to the second alternative mode of the preferred embodiment of the present invention.

Referring to FIG. 5 of the drawings, yet as a second alternative to the preferred embodiment of the present invention, the target SSID may also be determined and transmitted directly by the server without involving the client terminal.

Thus, step (101) may comprise the steps of:
(501) transmitting broadcast signals by an unconnected IOT participating device;
(502) obtaining a SSID list from the broadcast signals by a connected IOT participating device which is successfully connected to the IOT network; and
(503) transmitting SSID list from the connected IOT participating device to the server.

Step (103) may comprise the step (504) of ascertaining a target SSID by the server by reference to the SSID list and SSID data set.

Moreover, step (104) may comprise the steps of:
(505) transmitting the target SSID and the corresponding password from the server to the connected IOT participating device; and
(506) transmitting the target SSID and the corresponding password from the connected IOT participating device to the unconnected IOT participating device, so as to allow the unconnected IOT participating device to connect to the IOT network through the target SSID and the corresponding password to become a newly connected IOT participating device.

Accordingly, when a given unconnected IOT participating device has powered on and entered the connection mode, that given unconnected IOT participating device may search for available SSID and generate a SSID list. The SSID list may then be delivered as broadcast signals which may include an identification information of that particular IOT participating device, and other information relating to the detected SSIDs. The broadcast signals may be detected by a connected IOT participating device in the same IOT network. When there exists a plurality of connected IOT participating devices, the connected IOT participating device which receives the broadcast signals first may be adopted and the corresponding broadcast signals may be transmitted to the server.

The SSID list may then be transmitted to the server by the connected IOT participating device. The server may then ascertain a target SSID by reference to the SSID list and SSID data set. The server may then transmit the information relating to the target SSID and the corresponding password to the connected IOT participating device, which in turns transmit the target SSID and the corresponding password to the unconnected IOT participating device, so as to allow the unconnected IOT participating device to connect to the IOT network through connecting to the local area network of the target SSID by using the corresponding password to become a connected IOT participating device.

In this alternative mode of operation, when the unconnected IOT participating device has successfully been connected to the IOT network and become newly connected IOT participating device, this newly connected IOT participating device may transmit a feedback signal back the server for confirming that the originally unconnected IOT participating device has successfully been connected to the IOT network. The server may update the corresponding status in the corresponding user's account and transmit the corresponding information to the corresponding client terminal.

Figure 6:
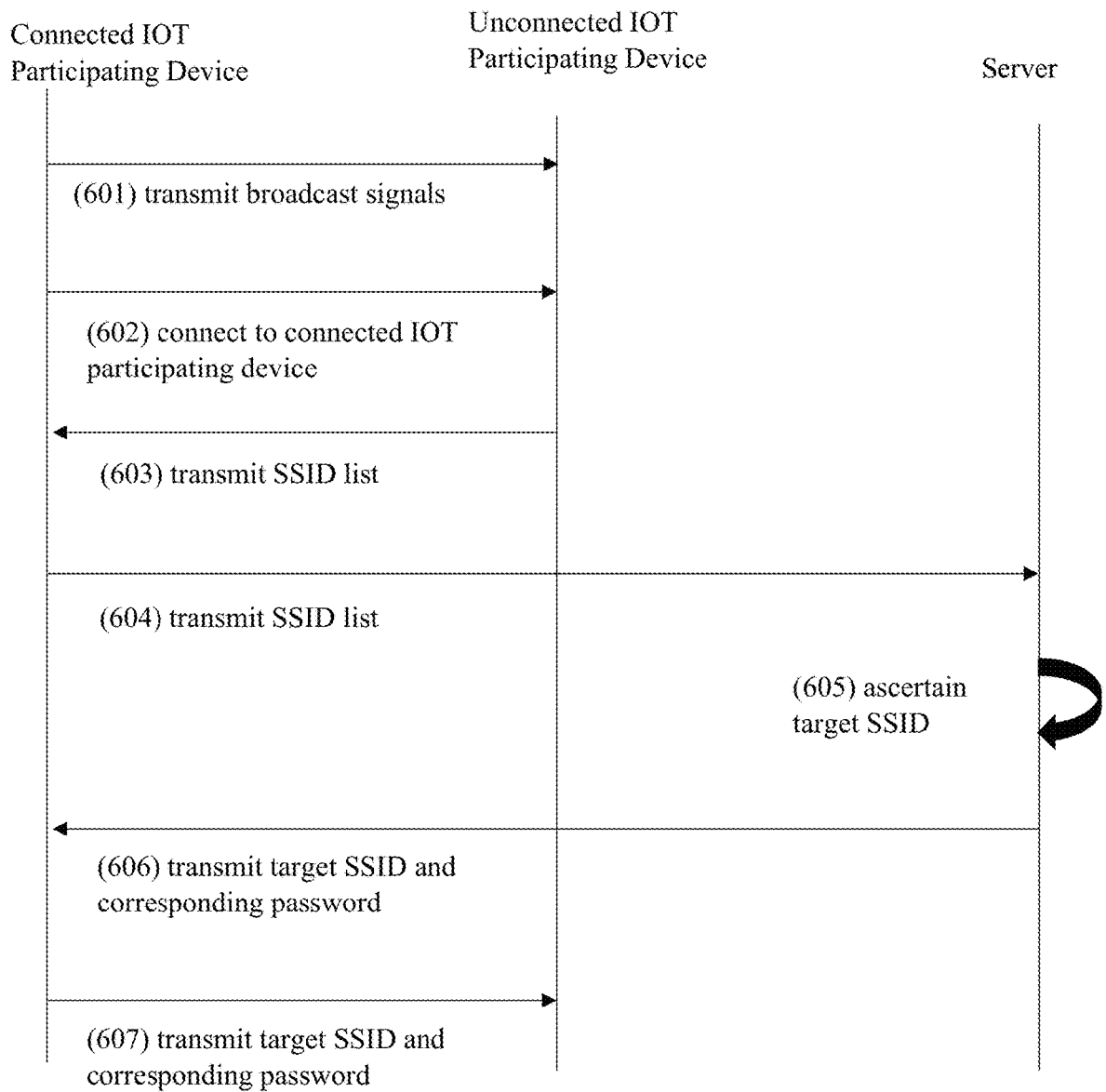
FIG. 6 is a schematic diagram illustrating interaction between IOT participating devices and IOT control devices according to the third alternative mode of the preferred embodiment of the present invention.

Referring to FIG. 6 of the drawings, yet a third alternative of the preferred embodiment of the present invention, the target SSID may also be determined and transmitted directly by the server without involving the client terminal. However, the connected IOT participating device and unconnected IOT participating device may pre-connect in some ways before the unconnected IOT participating device joins the IOT network.

Thus, step (101) may comprise the steps of:
(601) transmitting broadcast signals by a predetermined connected IOT participating device;
(602) receiving the broadcast signals by an unconnected IOT participating device, and connecting to said connected IOT participating device through a predetermined short-distance wireless communication protocol;
(603) transmitting a SSID list from the unconnected IOT participating device to a connected IOT participating device; and
(604) transmitting the SSID list from the connected IOT participating device to the server.

Step (103) may comprise the step (605) of ascertaining a target SSID by the server by reference to the SSID list and SSID data set.

Step (104) may comprise the steps of:
(606) transmitting the target SSID and the corresponding password from the server to the connected IOT participating device; and
(607) transmitting the target SSID and the corresponding password from the connected IOT participating device to the unconnected IOT participating device, so as to allow the unconnected IOT participating device to connect to the IOT network through the target SSID and the corresponding password to become a newly connected IOT participating device.

In step (601), the broadcast signals generated by the connected IOT participating device may only contain status information that the corresponding connected IOT participating device has been connected to an IOT network. This serves as generating a message to the nearby unconnected IOT participating device that the connected IOT participating device may be utilized for facilitating connection of the unconnected IOT participating device to the IOT network. When there exist more than one connected IOT participating device, a predetermined or pre-assigned connected IOT participating device may be utilized for facilitating connection of new unconnected IOT participating device. In step (602), the short-distance wireless communication protocol may be embodied as BLUETOOTH technology, ZIGBEE technology etc.

In step (603), the SSID list may be transmitted to the connected IOT participating device through the short-distance wireless communication. The SSID list may then be transmitted to the server by the connected IOT participating device. The server may then ascertain a target SSID by reference to the SSID list and a SSID data set. The server may then transmit the information relating to the target SSID and the corresponding password to the connected IOT participating device, which in turns transmit the target SSID and the corresponding password to the unconnected IOT participating device, so as to allow the unconnected IOT participating device to connect to the IOT network through connecting to the local area network of the target SSID by using the corresponding password to become a connected IOT participating device.

In this alternative mode of operation, when the unconnected IOT participating device has successfully been connected to the IOT network and become newly connected IOT participating device, this newly connected IOT participating device may transmit a feedback signal back to the server for confirming that the originally unconnected IOT participating device has successfully been connected to the IOT network. The server may update the corresponding status in the corresponding user's account and transmit the corresponding information to the corresponding client terminal.

Figure 7:
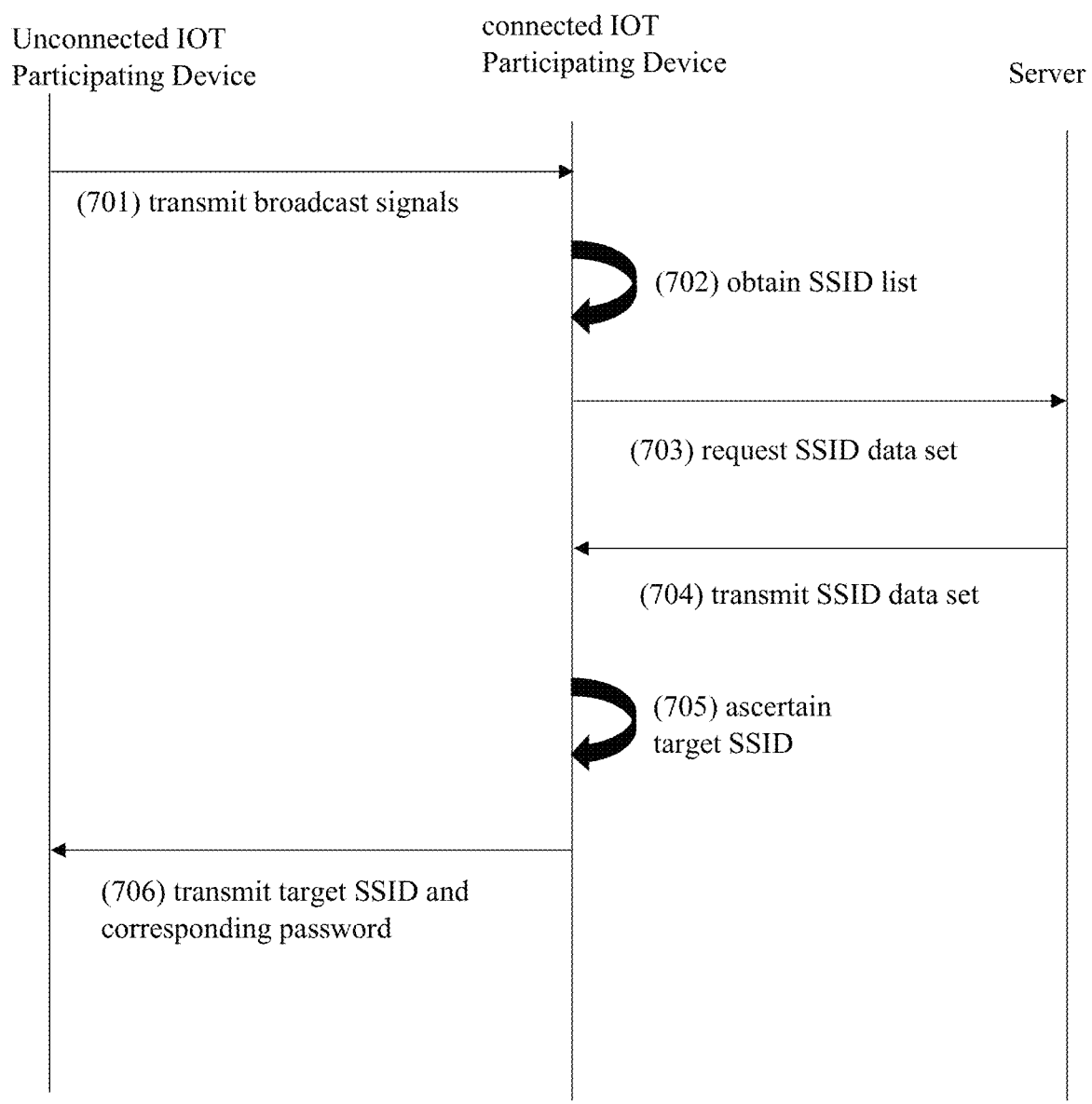
FIG. 7 is a schematic diagram illustrating interaction between IOT participating devices and IOT control devices according to the fourth alternative mode of the preferred embodiment of the present invention.

Referring to FIG. 7 of the drawings, as a fourth alternative of the preferred embodiment of the present invention, the target SSID may also be determined by the connected IOT participating device.

Thus, step (101) may comprise the steps of:
(701) transmitting broadcast signals by an unconnected IOT participating device;
(702) receiving the broadcast signals by a connected IOT participating device, and obtaining a SSID list from the broadcast signals;
(703) transmitting a request by the connected IOT participating device to the server for requesting a SSID data set from the server; and
(704) transmitting the SSID data set from server to the connected IOT participating device.

Step (103) may comprise the step (705) of ascertaining a target SSID by the connected IOT participating device by reference to the SSID list and SSID data set.

Step (104) may comprise the step (706) of transmitting the target SSID and the corresponding password from the connected IOT participating device to the unconnected IOT participating device, so as to allow the unconnected IOT participating device to connect to the IOT network through the target SSID and the corresponding password to become a newly connected IOT participating device.

Accordingly, when a given unconnected IOT participating device has powered on and entered the connection mode, that given unconnected IOT participating device may search for available SSID and generate a SSID list. The SSID list may then be delivered to as broadcast signals which may include an identification information of that particular IOT participating device, and other information relating to the detected SSIDs. The broadcast signals may be detected by a connected IOT participating device in the same IOT network. When there exists a plurality of connected IOT participating devices, the connected IOT participating device which receives the broadcast signals first may be adopted.

The connected IOT participating device may then make a request to the server to obtain the SSID data set. The SSID data set may then be transmitted to the corresponding connected IOT participating device. The connected IOT participating device may then ascertain a target SSID by reference to the SSID list and SSID data set. The server may then transmit the information relating to the target SSID and the corresponding password to the unconnected IOT participating device so as to allow the unconnected IOT participating device to connect to the IOT network through connecting to the local area network of the target SSID by using the corresponding password to become a newly connected IOT participating device.

When the unconnected IOT participating device has successfully been connected to the IOT network and become newly connected IOT participating device, this newly connected IOT participating device may transmit a feedback signal back to the server for confirming that the originally unconnected IOT participating device has successfully been connected to the IOT network. The server may update the corresponding status in the corresponding user's account and transmit the corresponding information to the corresponding client terminal.

Figure 8:
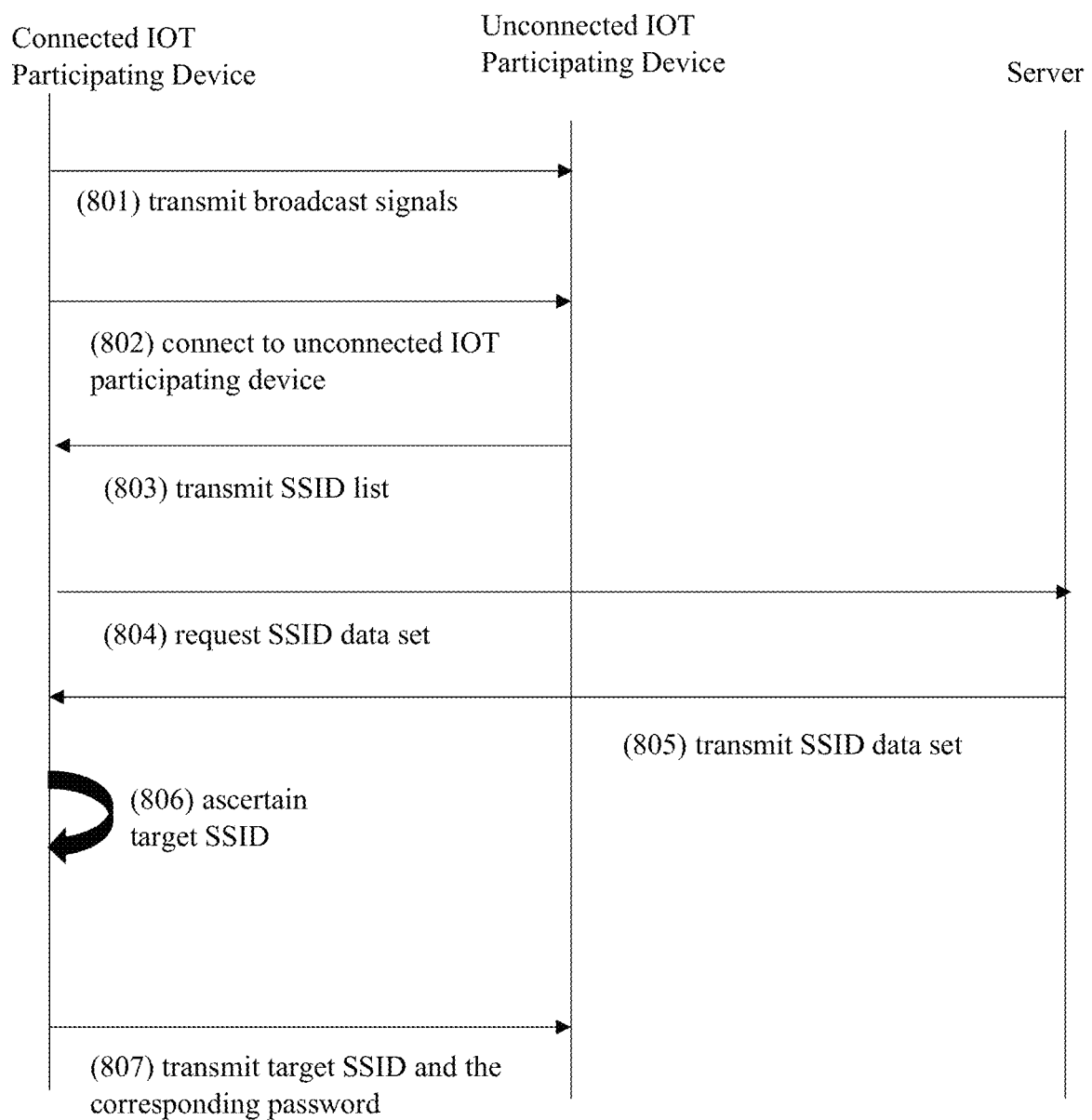
FIG. 8 is a schematic diagram illustrating interaction between IOT participating devices and IOT control devices according to the fifth alternative mode of the preferred embodiment of the present invention.

Referring to FIG. 8 of the drawings, as a fifth alternative of the preferred embodiment of the present invention, the target SSID may also be determined by the connected IOT participating device.

Thus, step (101) may comprise the steps of:
(801) transmitting broadcast signals by a predetermined connected IOT participating device;
(802) receiving the broadcast signals by an unconnected IOT participating device, and connecting to said connected IOT participating device through a predetermined short-distance wireless communication protocol;
(803) transmitting a SSID list from the unconnected IOT participating device to a connected IOT participating device;
(804) transmitting a request by the connected IOT participating device to the server for requesting a SSID data set from the server; and
(805) transmitting the SSID data set from server to the connected IOT participating device.

Step (103) may comprise the step (806) of ascertaining a target SSID by the connected IOT participating device by reference to the SSID list and SSID data set.

Step (104) may comprise the step (807) of transmitting the target SSID and the corresponding password from the connected IOT participating device to the unconnected IOT participating device, so as to allow the unconnected IOT participating device to connect to the IOT network through the target SSID and the corresponding password to become a newly connected IOT participating device.

In step (801), the broadcast signals generated by the connected IOT participating device may only contain status information that the corresponding connected IOT participating device has been connected to an IOT network. This serves as generating a message to the nearby unconnected IOT participating device that the connected IOT participating device may be utilized for facilitating connection of the unconnected IOT participating device to the IOT network. When there exist more than one connected IOT participating device, a predetermined or pre-assigned connected IOT participating device may be utilized for facilitating connection of new unconnected IOT participating device. In step (802), the short-distance wireless communication protocol may be embodied as BLUETOOTH technology, ZIGBEE technology etc.

In step (803), the SSID list may be transmitted to the connected IOT participating device through the short-distance wireless communication. The connected IOT participating device may then make a request to the server to obtain the SSID data set. The SSID data set may then be transmitted to the corresponding connected IOT participating device from the server. The connected IOT participating device may then ascertain a target SSID by reference to the SSID list and SSID data set. The connected IOT participating device may then transmit the information relating to the target SSID and the corresponding password to the unconnected IOT participating device so as to allow the unconnected IOT participating device to connect to the IOT network through connecting to the local area network of the target SSID by using the corresponding password to become a newly connected IOT participating device.

When the unconnected IOT participating device has successfully been connected to the IOT network and become newly connected IOT participating device, this newly connected IOT participating device may transmit a feedback signal back to the server for confirming that the originally unconnected IOT participating device has successfully been connected to the IOT network. The server may update the corresponding status in the corresponding user's account and transmit the corresponding information to the corresponding client terminal.

Figure 9:
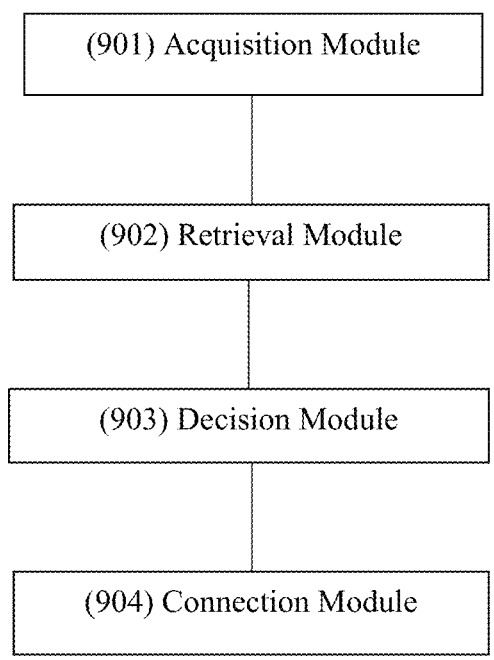
FIG. 9 is a schematic diagram illustrating an IOT management and control system according to the preferred embodiment of the present invention.

Referring to FIG. 9 of the drawings, the IOT management and control method described above may be carried by an IOT management and control system, which comprises:
- an acquisition module 901 configured to receive a SSID list searched by an unconnected IOT participating device, and a SSID data set stored in the server;
- a retrieval module 902 configured to the receive at least one SSID candidate and a corresponding password from the SSID list and the SSID data set;
- a decision module 903 configured to select a target SSID when there exist more than one SSID candidate in the SSID data set, the target SSID may be selected according to at least one predetermined performance parameter of each of said SSID candidates; and
- a connection module 904 configured to execute connection, through the use of the corresponding password, of said unconnected IOT participating device to the IOT network through connecting to said local arear network of the target SSID.

It is worth mentioning that the terms and limitations used in the IOT control and management system are identical to those described in relation to the method of controlling network distribution described above. For example, the SSID list described in the acquisition module 901 is identical to the SSID list described in steps (101) to (104) above.

From the forgoing descriptions, it can be appreciated that by acquiring the SSID data set, the IOT control and management system and method thereof may utilize a successfully connected SSID and its corresponding password within a predetermined timeframe to facilitate automatic connection of an unconnected IOT participating device to that connected SSID. No manual searching of and connection to possible SSIDs is required. This substantially enhances users' experience in connecting an unconnected IOT participating device to an IOT network. Moreover, when there exist more than one SSID candidate, the IOT control and management system and method thereof may automatically decide which SSID will be the best to connect based on predetermined performance parameters of each of the SSID candidate.

Figure 10:
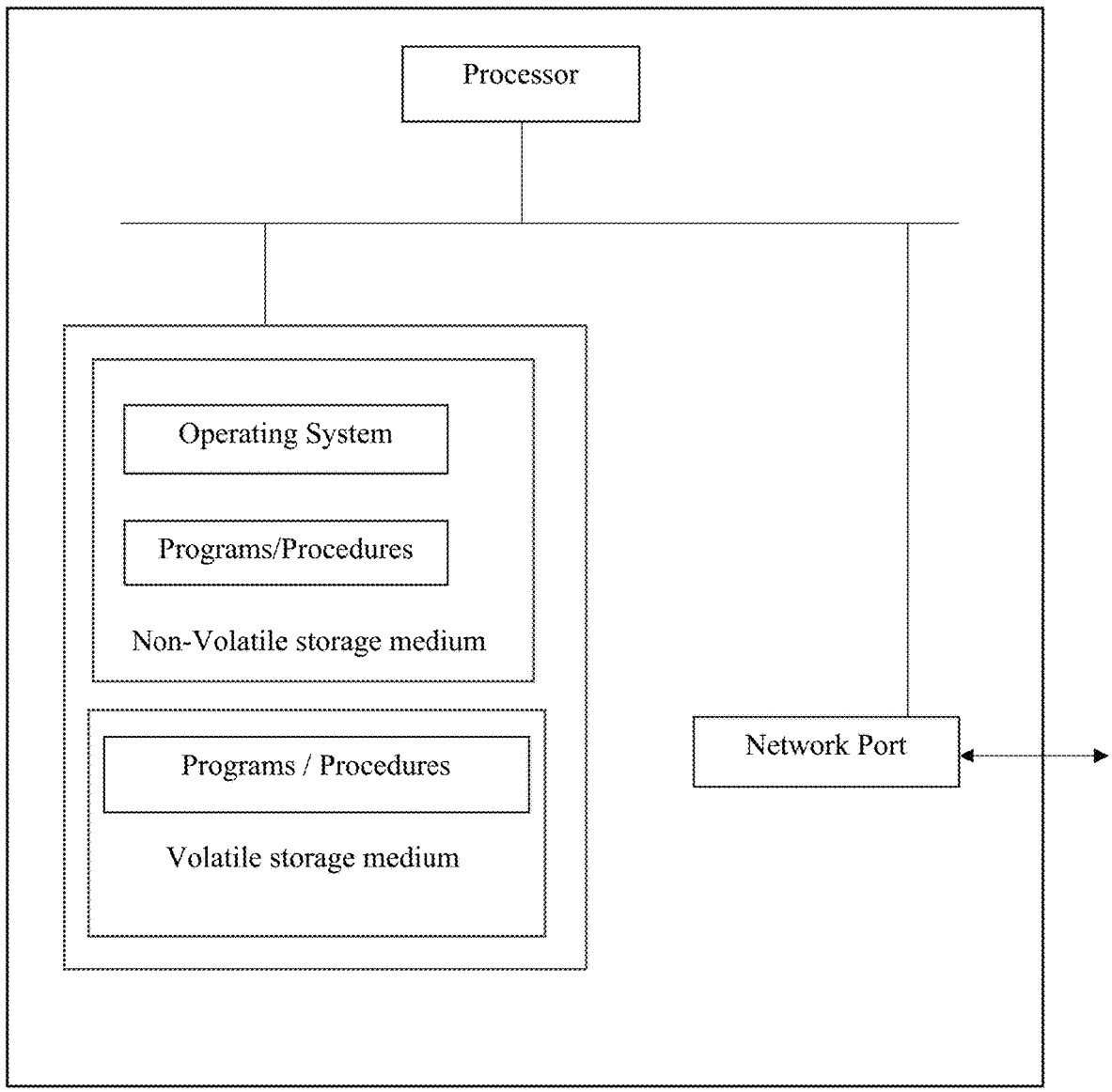
FIG. 10 is a schematic diagram illustrating computing hardware for an IOT management and control system according to the preferred embodiment of the present invention.

Referring to FIG. 10 of the drawings, the IOT management and control system and the method thereof may be executed by a computing device. The computing device may be configured as a terminal or a server. The computing device may comprise a processor, a memory device and a network port. The memory device may comprise volatile storage medium, non-volatile storage medium and/or an internal memory. The memory device may store a predetermined program for executing, through the processor, the control and management system and method thereof in the manner as described above.

Examples of the non-volatile storage medium may include read-only memory (ROM), programmable read-only memory (PROM), erasable programmable read-only memory (EPROM), electrically erasable programmable read-only memory (EEPROM), flash storage etc. Examples of volatile storage medium may include random-access memory (RAM), static random-access memory (SRAM), dynamic random-access memory (DRAM), synchronous DRAM, enhanced synchronous DRAM, double data rate synchronous dynamic random-access memory (DDR SDRAM), synchronous link DRAM, RAMBUS DRAM, etc.

The present invention, while illustrated and described in terms of a preferred embodiment and several alternatives, is not limited to the particular description contained in this specification. Additional alternative or equivalent components could also be used to practice the present invention.

What is claimed is:

1. A method of managing a network connection for an Internet of Things (IOT) network comprising steps of:
   (101) acquiring a Service Set Identifier (SSID) list for a network connection of an unconnected IOT participating device from said unconnected IOT participating device, and retrieving an SSID data set from a server, said SSID data set including information relating to at least one SSID having past successful connections and corresponding SSID passwords for a predetermined past period of time;
   (102) according to said SSID list and SSID data set, obtaining an SSID target set, said SSID target set including information relating to an SSID candidate which is to be used for the network connection of said unconnected IOT participating device, and a corresponding SSID password for said SSID candidate;
   (103) when said SSID target set contains at least two SSID candidates, ascertaining a target SSID from said at least two SSID candidates according to a performance parameter of each of said at least two SSID candidates; and
   (104) connecting said unconnected IOT participating device to a target network which corresponds to said target SSID by using a corresponding SSID password thereof to become a connected IOT participating device, said performance parameter comprising at least one of: a most recent successful connection time, signal strength, a number of previous successful connections in said past predetermined period of time, and a number of IOT participating devices which are currently connected in said IOT network corresponding to each of said at least two SSID candidates;
   wherein in said step (101), said SSID list is formed by a series of detected SSI Ds around said unconnected IOT participating device; and wherein in said step (102), each of SSIDs in said SSID list is to be matched with each SSID in said SSID data set, wherein when an SSID in said SSID list matches with said each SSID in said SSID data set, said SSID and a corresponding password is assigned as an SSID candidate and stored in said SSID target set;

said method of managing the network connection for the IOT network further comprising steps, before said step (101), of:

receiving broadcast signals, and discovering at least one unconnected IOT participating device based on said broadcast signals; and when there exists at least two unconnected IOT participating devices, sequentially assigning all of said at least two unconnected IOT participating devices as target unconnected IOT participating devices, and connecting said target unconnected IOT participating devices to the IOT network, wherein a sequence of connecting said at least two unconnected IOT participating devices is determined by a predetermined rules of priority, said broadcast signals including at least one of: a device identification, information relating to said SSID list, and an authentication parameter, wherein said priority of connecting to said IOT network by said at least two unconnected IOT participating devices is determined by steps of:

(a) obtaining a strength of said broadcast signals of an unconnected IOT participating device of said at least two unconnected IOT participating devices, a total number of unconnected IOT participating devices, and a time at which said broadcast signals are received; and (b) ascertaining said priority of connecting to said IOT network by said at least two unconnected IOT participating devices based on said strength of said broadcast signals of said IOT participating device of said at least two unconnected IOT participating devices, a total number of connected IOT participating devices, and said time at which said broadcast signals received.

2. The method, as recited in claim 1, wherein said step (b) comprises steps of:

when said total number of unconnected IOT participating devices is no greater than a predetermined threshold, assigning said priority of connections of said at least two unconnected IOT participating devices based on the time at which said broadcast signals is received, wherein said unconnected IOT participating device of said at least two unconnected participating IOT devices having an earliest broadcast signal time is accorded a first priority to be connected to said IOT network; and when said total number of unconnected IOT participating devices is greater than said predetermined threshold, assigning said priority of connections of said at least two unconnected IOT participating devices based on said strength of said received broadcast signals, wherein said unconnected IOT participating device of said at least two unconnected participating IOT devices having a strongest broadcast signal strength is accorded said first priority to be connected to said IOT network.

* * * * *